UNITED STATES PATENT OFFICE 2,646,338

DISAZO DYESTUFFS

Markus Kappeler, Willy Steinemann, and Walter Wehrli, Basel, Switzerland, assignors to Sandoz A. G., Basel, Switzerland No Drawing. Application October 3, 1951, Serial No. 249,634. In Switzerland October 4, 1950

6 Claims. (Cl. 8—26)

The present invention relates to metallizable disazo dyestuffs.

A primary object of the invention is the embodiment of a new group of substantive and metallizable disazo dyestuffs which yield yellow dyeings on textile materials—more especially on cotton and regenerated cellulose—which are of vivid pure shade and which have excellent light fastness properties.

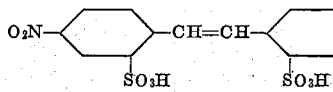

This object is realized, according to the invention, by the group of dyestuffs which correspond to the formula

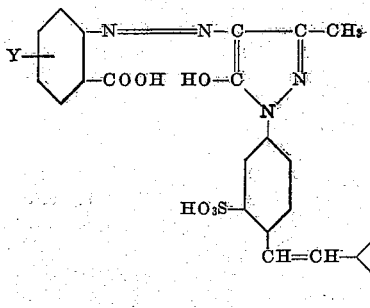

wherein Y stands for hydrogen or an —SO₃H group, and A stands for hydrogen, chlorine, bromine or methyl.

The aforesaid disazo dyestuffs are prepared, according to the present invention, by reacting the diazo compound of a 2-aminobenzene-1-carboxylic acid or the diazo compounds of different 2-aminobenzene-1-carboxylic acids of the formula

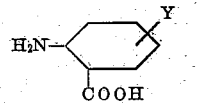

wherein Y stands for hydrogen or an —SO₃H group, with a dipyrazolone of the formula

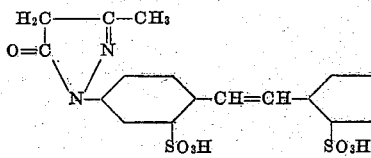

wherein A represents hydrogen, chlorine, bromine or methyl.

2-aminobenzene-1-carboxylic acids which can be employed for the preparation of the aforesaid diazo compounds, according to the invention, comprise for example 2-aminoebenzene-1-carboxylic acid and the 2-amino-1-carboxybenzene-4- and 5-sulfonic acids.

As starting material for the preparation of the dipyrazolone of Formula II, use may advantageously be made of the compound of the formula

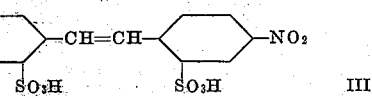

wherein A stands for hydrogen, chlorine, bromine or methyl, and which can be prepared by the reaction between 1 mol of the dihalide of the formula

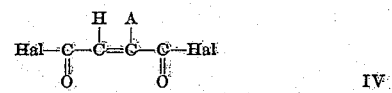

wherein Hal stands for Cl or Br and 2 mols of 4-

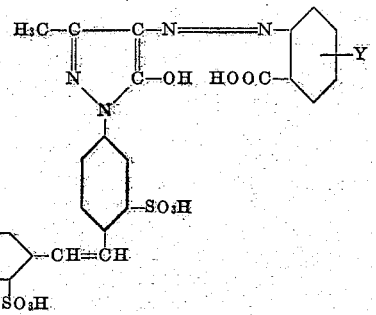

amino-4'-nitrostilbene-2,2'-disulfonic acid, converting the said compound of Formula III into the corresponding diamino and dihydrazino compound, and then condensing the latter with ethyl-acetoacetic acid ester, whereby the dipyrazolone of Formula II is obtained.

Coupling is carried out in aqueous medium, optionally in the presence of an organic base such for example as pyridine and its homologs. The coupling may take place in molecular proportion, provided that 2 mols of diazo compound or compounds I combine with 1 mol of dipyrazolone II. The 2 mols of diazo compound I may be of the identical compound, wherein Y is either hydrogen or an —SO₃H group, or they may be of mixed compounds, wherein Y in one mol is hy-

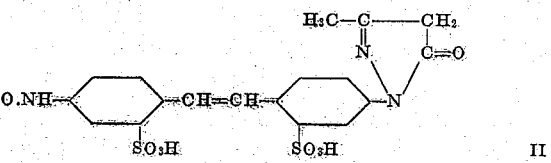

drogen and in the other is the —SO₃H group. The properties of the final dyestuff can be readily modified as desired, by modifying the proportion of the two diazo compounds, in one of which Y is hydrogen and in the other —SO₃H, so that the proportion—instead of being 1:1—is for example 4:1, 3:1, 2:1, 1:2, 1:3, 1:4, etc., provided that in any case a total of 2 mols of the mixture of diazo compounds reacts with 1 mol of the dipyrazolone. Alternatively, the dipyrazolone may be coupled separately with each of the two diazo compounds, followed by admixture of the resultant disazo dyestuffs in any desired proportion, whereupon likewise very valuable dyestuff mixtures are obtained, which can be metallized on the fiber or in substance. The metallization in substance can precede or follow the admixture of the two components.

The same dyestuff is produced when an aminoazo compound of the formula

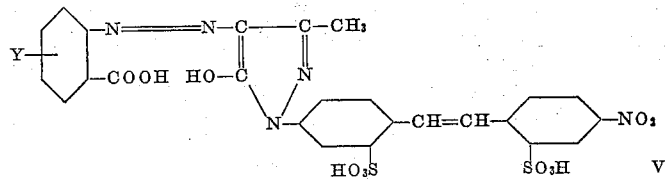

wherein Y stands for hydrogen or —SO₃H, is condensed with a dihalide of the formula

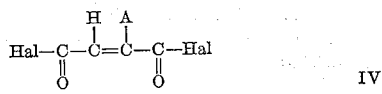

wherein Hal stands for Cl or Br and A stands for hydrogen, chlorine, bromine or methyl.

Dihalides of Formula IV, used for condensing with the starting material, are for example the dichlorides or dibromides of fumaric acid, maleic acid, mesaconic acid, citraconic acid, chlorofumaric acid or bromofumaric acid. They are employed in a proportion such that there is 1 mol of dihalide IV for each two mols of aminoazo compound V. In order to compensate for possible losses due to hydrolysis, a slight excess of dihalide may be employed.

The two mols of aminoazo compound V may be of a single compound or they may be of a mixture of different compounds; thus, for example, it is possible to condense (a) 2 mols of aminoazo compound V wherein Y stands for hydrogen; or (b) 2 mols of aminoazo compound V wherein Y stands for —SO₃H; or (c) 1 mol of aminoazo compound V wherein Y stands for hydrogen and one mol of aminoazo compound V wherein Y stands for —SO₃H; or (d) 0.4 mol of aminoazo compound V wherein Y stands for hydrogen and 1.6 mols of aminoazo compound V wherein Y stands for —SO₃H; or (e) 1.6 mols of aminoazo compound wherein Y stands for hydrogen and 0.4 mol of aminoazo compound V wherein Y stands for —SO₃H, with 1 mol of dihalide IV, it being possible to vary the mixtures as desired. The mixture variation produces a change in the properties of the end product, so that it thus becomes possible to realize desired properties by suitable combinations.

In order to carry out the process, the aminoazo compound or mixture of aminoazo compounds is dissolved in water, and the dihalide then added at a low temperature (about —10° to 30° C.). The reaction mixture is vigorously stirred, and care is taken—by the addition of an acid-binding agent, such for example as an alkali metal salt or an alkaline earth metal salt of a low molecular fatty acid, a carbonate or bicarbonate or hydroxide of an alkali metal or alkaline earth metal, a secondary or tertiary alkali metal phosphate, a corresponding magnesium compound, or magnesium oxide—that the reaction remains substantially neutral throughout.

The dihalide can, if desired, be diluted with an inert solvent, such for example as carbon tetrachloride, chloroform, chlorobenzene or benzene. The condensation is concluded when no more free amine can be detected.

The disazo dyestuffs obtained according to the aforedescribed processes are yellow powders which dissolve in water and in concentrated sulfuric acid with yellow coloration. They dye cotton and regenerated cellulose in pure yellow shades which, upon treatment with metal-yielding agents, are endowed with excellent light-fastness and wet-fastness properties.

The disazo dyestuffs can also be converted in substance into the corresponding complex metal compounds by treatment with metal yielding agents, such for example as copper acetate or ammoniacal copper oxide.

The metallization in substances of the disazo dyestuffs prepared according to the condensation process may also take place prior to the condensation of the aminoazo compound V with the dihalide IV. In the event that mixtures are being prepared, it is possible to subject the several components, individually or in admixture, to metallization and thereafter to effect the combination with the dihalide.

The coppered disazo dyestuffs, for example, are brown powders which dissolve in water with yellow coloration and dye cotton and regenerated cellulose in pure yellow shades of very good light-fastness and wet-fastness properties.

The following examples set forth representative exemplary embodiments of the invention, and these examples are intended to be solely illustrative and not at all limitative. In these examples, the parts and percentages are by weight unless otherwise indicated, and the temperatures are expressed in degrees centigrade. Parts by weight bear the same relation to parts by volume as do grams to cubic centimeters. The term "soda" refers to sodium carbonate.

*Example 1*

27.4 parts of 2-aminobenzene-1-carboxylic acid are dissolved in 50 parts of concentrated hydrochloric acid and 75 parts of water, and are then diazotized at 0° with a solution of 14 parts of sodium nitrite. The resultant diazo compound is coupled in soda-alkaline solution with 98.2 parts of the dipyrazolone of the formula

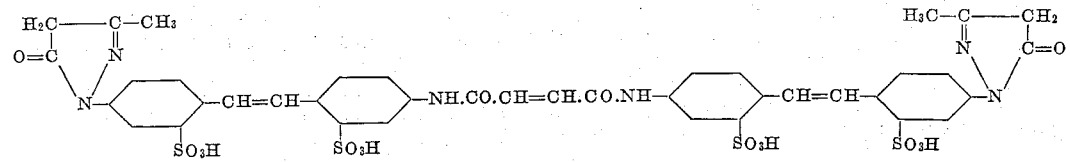

Upon termination of the coupling, the reaction mass is heated, a small amount of sodium chloride added, and boiling continued until the dyestuff pulp is converted into an easily filtrable precipitate. The precipitate is then filtered off hot and dried.

The thus-obtained dyestuff

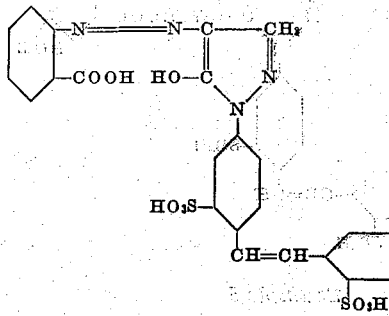

is a yellow powder which dissolves in water and in concentrated sulfuric acid with yellow coloration and dyes cotton, by the aftercoppering process, in clear yellow shades which are lightfast and wash-fast.

A similar dyestuff

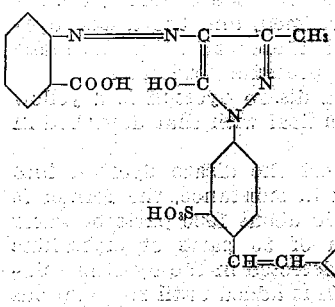

is obtained when the dipyrazolone VI, supra, is replaced by a corresponding dipyrazolone containing the bridge

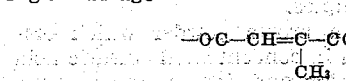

instead of the —OC—CH=CH—CO— bridge.

Example 2

119.8 parts of the aminoazo compound of the formula

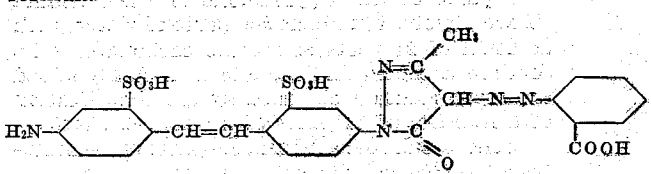

are dissolved in water and 80 parts of aqueous caustic soda solution of 30% strength. To the resultant dyestuff solution, there is slowly added dropwise at ordinary temperature (about 20–30°) or at slightly elevated temperature and with energetic stirring, a benzolic solution of 15.3 parts of fumaric acid dichloride and, at the same time, an aqueous solution of 12 parts of soda. The obtained disazo dyestuff starts to precipitate out in a short time and, when the reaction is completed, the reaction mass is a thick pulp. The latter is heated, a small quantity of sodium chloride and pyridine added, and boiling carried out until the dyestuff has been converted into the form of a

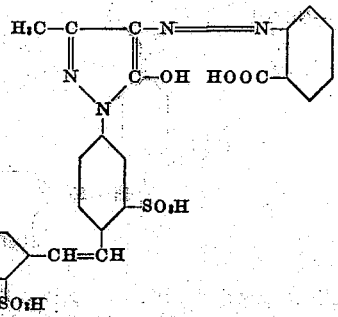

readily filtrable precipitate. The latter is filtered hot and dried.

The thus-obtained dyestuff is identical with the product obtained according to Example 1.

Dyestuffs with similar properties are obtained when, while otherwise proceeding as described in

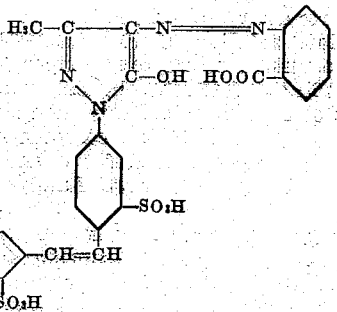

the first paragraph of this example, the fumaric acid dichloride is replaced by an equivalent amount of the dichloride or dibromide of maleic acid, mesaconic acid, citraconic acid, chlorofumaric acid or bromofumaric acid.

Example 3

28 parts of the aminoazo compound of the formula

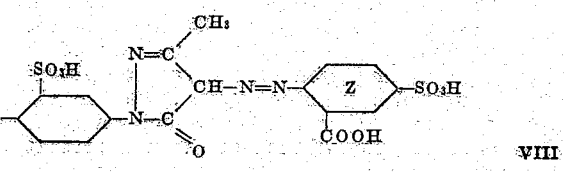

are suspended in 800 parts of water, solution being thereupon effected by the addition of sodium carbonate. 8 parts of sodium bicarbonate are then added to the solution, which is then cooled to 0–5°. While stirring thoroughly, a solution of fumaric acid dichloride in chlorobenzene is uniformly added at 0–5° until no more aminoazo dyestuff is detectable. This operation requires about 2–3 hours. The dyestuff solution is then heated to 60–70°, adjusted to neutrality to litmus by the addition of a little acetic acid, and the formed disazo dyestuff salted out with sodium chloride and filtered off.

The thus-obtained dyestuff

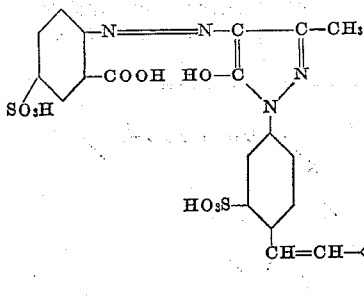

is a yellow powder which dissolves in water and in concentrated sulfuric acid with yellow coloration. It dyes cotton and regenerated cellulose in pure yellow shades which, aftertreated with metal-yielding agents, are of excellent light-fastness and wet-fastness.

To effect conversion into the copper complex in substance, the disazo dyestuff is dissolved in 500 parts of water at 60–70° and, after addition of 15 parts of crystallized sodium acetate, a copper sulfate solution of 10% strength is added dropwise until free cuprous copper ions can be detected in the dyestuff solution. The necessary amount of sodium chloride is then added to the solution to precipitate the complex metal compound, stirring continued for a short while at 60–70°, and the precipitate finally filtered off warm.

The coppered dyestuff is a brown powder which dissolves in water and in concentrated sulfuric acid with yellow coloration. It dyes cotton and regenerated cellulose in pure yellow shades of excellent fastness to light and of very good wet-fastness properties.

Similar dyestuffs are obtained by replacing the aminoazo compound VII by the isomeric compound which contains the SO₃H group of the nucleus Z in p-position to the —COOH group.

Example 4

28 parts of the aminazo compound of Formula VIII are dissolved in 500 parts of hot water with addition of sodium carbonate. To the resultant dyestuff solution, there are successively added 15 parts of crystalline sodium acetate and a solution of 10.5 parts of crystalline copper sulfate in 100 parts of water. Stirring is continued for some time at 60–70°, the solution of the now present complex copper compound neutralized with sodium bicarbonate until it has a weakly alkaline reaction to litmus, 8 more parts of sodium bicarbonate added, the volume of the solution adjusted to 800 parts by volume by the addition of water, and the whole then cooled to 0 to 5°. At the latter temperature and in the course of 2–3 hours, a solution of 10% strength of fumaric acid dichloride in chlorobenzene is evenly added dropwise, until no more free amino groups can be detected. The solution is then heated to 60–70°, the complex copper compound of the thus-obtained disazo dyestuff precipitated by the addition of sodium chloride, the mixture stirred for a short time at 60–70° and the precipitate then filtered off warm.

The obtained dyestuff is identical with the copper complex described in Example 3.

Dyestuffs with similar properties are obtained when, while otherwise proceeding as precedingly described, the fumaric acid dichloride is replaced by an equivalent quantity of fumaric acid dibromide or of a mesaconic acid dihalide.

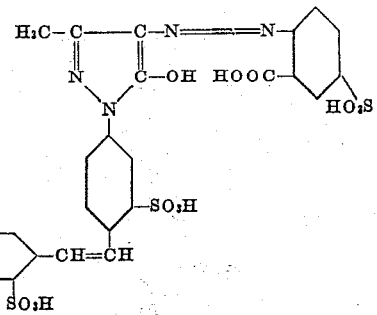

Example 5

49 parts of the dipyrazolone of Formula VI are dissolved, with 21 parts of sodium carbonate, in about 500 parts of water. The solution is cooled to 0–5°, whereupon there is slowly added the diazo compound obtained by the diazotization of 22 parts of 2-amino-1-carboxybenzene-5-sulfonic acid. Upon completion of the coupling, the reaction mixture is warmed, and the disazo dyestuff salted out and filtered off after the manner described in the preceding examples.

The thus-obtained disazo dyestuff is a yellow powder which is identical with that described in Example 3.

In order to convert the disazo dyestuff into the copper complex in substance, the former is dissolved at 60–70° in about 1000 parts of water and, after addition of 30 parts of crystalline copper ions can be detected in the dyestuff solution of 10% strength is added until free cuprous copper ions can be detected in the dyestuff solution. The latter is stirred for a short time longer at 60–70°, and then the dyestuff is salted out and filtered off after the manner described in the preceding examples.

The product is a brown powder which dissolves in water and in concentrated sulfuric acid with yellow coloration and dyes cotton and regenerated cellulose in pure yellow shades of excellent fastness to light and of very good wet-fastness properties.

A similar dyestuff is obtained when, while otherwise proceeding as described in the first paragraph of the present example, the 22 parts of 2-amino-1-carboxybenzene-5-sulfonic acid are replaced by 22 parts of 2-amino-1-carboxybenzene-4-sulfonic acid.

Example 6

49 parts of the dipyrazolone of the Formula VI are dissolved in about 500 parts of water, with addition of 21 parts of sodium carbonate. The solution is cooled and there is then slowly added the diazo solution obtained by the diazotization of a mixture of 11 parts of 2-amino-1-carboxybenzene-5-sulfonic acid and 6.9 parts of 2-aminobenzene-1-carboxylic acid. When the coupling is over, the reaction mass is heated, and the dyestuff salted out and filtered off after the manner hereinbefore described. The thus-obtained dyestuff is a yellow powder which dissolves in water and in concentrated sulfuric acid with yellow coloration. It dyes cotton and regenerated cellulose in pure yellow shades which, treated with metal-yielding agents, possess excellent light-fastness and wet-fastness properties.

In order to convert the disazo dyestuff into the copper complex in substance, the former is dissolved at 60–70° in about 1000 parts of water; after the addition of 30 parts of crystalline sodium acetate, an aqueous copper sulfate solution of 10% strength is added until free cuprous copper ions can be detected in the dyestuff solution. Stirring is continued for a short time at 60–70°, and then the copper complex is salted out and isolated. It is a brown powder which dissolves in water and in concentrated sulfuric acid with yellow coloration and dyes cotton and regenerated cellulose in pure yellow shades of very good light-fastness and excellent wet-fastness properties.

A very similar dyestuff is obtained when a mixture of 16.3 parts of 2-amino-1-carboxybenzene-5-sulfonic acid and 3.4 parts of 2-aminobenzene-1-carboxylic acid is diazotized and coupled with 49 parts of the aforesaid dipyrazolone of Formula VI, and then proceeding as otherwise described in the first paragraph of this example.

A similar dyestuff is likewise obtained when, in lieu of the 11 parts of 2-amino-1-carboxybenzene-5-sulfonic acid (in paragraph 1 of the present example), there are substituted 11 parts of 2-amino-1-carboxybenzene-4-sulfonic acid.

Example 7

49 parts of the dipyrazolone of Formula VI are dissolved in about 500 parts of water, with addition of 21 parts of sodium carbonate, the resultant solution cooled with ice and admixed with a diazo solution prepared by diazotizing a mixture of 5.4 parts of 2-amino-1-carboxybenzene-5-sulfonic acid and 10.3 parts of 2-aminobenzene-1-carboxylic acid.

After the coupling has ended, the reaction mass is heated, and the formed dyestuff salted out and isolated.

The thus-obtained dyestuff has properties similar to those of the dyestuff of Example 6, first paragraph. In order to convert it into the copper complex in substance, the disazo dyestuff is dissolved in about 1000 parts of water, and at 60–70°, an ammoniacal copper oxide solution corresponding to 25 parts of copper sulfate is added. The formed copper complex is salted out, filtered off and dried. It is a brown powder with properties similar to those of the copper complex obtained according to Example 6.

Similar dyestuffs are obtained when the dipyrazolone having the —OC—CH=CH—CO— bridge is replaced by the corresponding dipyrazolone with the

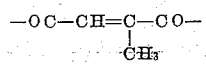

or

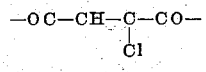

bridge.

Example 8

49 parts of the dipyrazolone of the Formula VI are coupled in soda-alkaline solution with a diazo solution prepared from 13.7 parts of 2-aminobenzene-1-carboxylic acid. In like manner, 24.5 parts of the dipyrazolone of Formula VI are coupled with the diazo solution prepared from 11 parts of 2-amino-1-carboxybenzene-5-sulfonic acid.

The two dyestuff solutions are combined, heated to about 70°, and the disazo dyestuff mixture isolated by salting out and filtering off. The thus-obtained dyestuff mixture is a yellow powder which is similar to those obtained according to Examples 6 and 7.

In order to convert it into the copper complex in substance, the mixture of disazo dyestuff is dissolved in about 1500 parts of water, whereupon an ammoniacal copper oxide solution corresponding to 30 parts of copper sulfate is added at 60–70°. The thus-produced copper complex is salted out, filtered off and dried. It is a brown-olive powder which has properties similar to those of the copper complexes obtained according to Examples 6 and 7.

A similar dyestuff mixture is obtained if the two aforementioned disazo dyestuffs are coppered individually and only thereafter admixed.

Example 9

34 parts of the aminoazo compound obtained by coupling diazotized 2-amino-1-carboxybenzene-5-sulfonic acid with 4-amino-4'-(3''-methyl-5''-pyrazolone)-stilbene-2,2'-disulfonic acid, and 30 parts of the aminoazo compound prepared by coupling 2-diazobenzene-1-carboxylic acid with 4-amino-4'-(3''-methyl-5''-pyrazolone)-stilbene-2,2'-disulfonic acid are dissolved in water, with the addition of sodium carbonate. The solution is cooled to 5–10° by the addition of crushed ice and, at the said temperature, a benzolic solution of fumaric acid dichloride of 10% strength is uniformly added dropwise and with very thorough stirring until free amino groups can no longer be detected in the reaction solution. By the simultaneous dropwise addition of an aqueous sodium carbonate solution of 10% strength, the reaction solution is constantly maintained weakly alkaline. The formed disazo dyestuff is isolated by salting out and filtering off. It is a yellow powder which dissolves in water and in concentrated sulfuric acid with yellow coloration. It dyes cotton and regenerated cellulose in pure yellow shades which, upon after-treatment with metal-yielding agents, possess excellent light-fastness and wet-fastness properties.

In order to convert the thus-obtained disazo dyestuff into the copper complex in substance, the disazo dyestuff is dissolved in 1000 parts of water at 60–70°. After addition of 30 parts of crystalline sodium acetate, an aqueous copper sulfate solution of 10% strength is added until free cuprous copper ions can be detected. The cupriferous dyestuff is then precipitated out and filtered off. It is a brown powder which dissolves in water with yellow coloration and dyes cotton and regenerated cellulose in pure yellow shades of very good fastness to light and excellent wet-fastness properties.

Dyestuffs with similar properties are obtained when the fumaric acid dichloride is replaced by fumaric acid dibromide or by a mesaconic acid dihalide or by a chlorofumaric acid dihalide or by a bromofumaric acid dihalide or by a maleic acid dihalide.

Example 10

A mixture of 173.6 parts of 2-amino-1-carboxybenzene-5-sulfonic acid and 27.4 parts of 2-aminobenzene-1-carboxylic acid in 3000 parts of water are diazotized and, in the presence of the requisite amount of sodium carbonate, coupled with a solution of 451 parts of 4-amino-4'-(3''-methyl-5''-pyrazolone)-stilbene-2,2'-disulfonic acid in 3000 parts of water.

The thus-obtained dyestuff solution is heated to 60-70°, adjusted to weak acidity to litmus by means of acetic acid, and converted into the copper complex by the addition of 250-260 parts of copper acetate. The solution is then rendered weakly alkaline to Brilliant Yellow by the addition of sodium carbonate and, after filtering off any separated copper carbonate, then brought to a temperature of about 5° and to a volume of 20,000 parts by volume by the addition of crushed ice and water. Thereupon, in the course of 3-4 hours, a solution of 10% strength of fumaric acid dichloride in chlorobenzene is added dropwise until no more diazotizable dyestuff can be detected in the condensation solution. During this operation, the reaction of the solution must be kept substantially neutral by the occasional addition of small portions of sodium bicarbonate. The thus-obtained dyestuff mixture is isolated by salting-out and filtering off. It has properties similar to that of the mixture described in Example 9.

A very similar dyestuff mixture with equally good properties is obtained when a mixture of 144.7 parts of 2-amino-1-carboxybenzene-5-sulfonic acid and 45.7 parts of 2-aminobenzene-1-carboxylic acid is diazotized, coupled with 451 parts of 4 - amino - 4' - (3'' - methyl-5''-pyrazolone)-stilbene-2,2'-disulfonic acid, coppered in the manner precedingly described in this example and treated with fumaric acid dichloride.

A similar dyestuff is likewise obtained upon replacement of the 2-amino-1-carboxybenzene-5-sulfonic acid by 2-amino-1-carboxybenzene-4-sulfonic acid.

Example 11

80 parts of the aminoazo compound prepared by coupling diazotized 2-aminobenzene-1-carboxylic acid with 4-amino-4'-(3''-methyl-5''-pyrazolone)-stilbene-2,2'-disulfonic acid, and 45.4 parts of the aminoazo compound prepared from diazotized 2-amino-1-carboxybenzene-5-sulfonic acid and 4-amino-4'-(3''-methyl-5''-pyrazolone)-stilbene-2,2'-disulfonic acid are suspended in 2000 parts of water and dissolved by the addition of sodium carbonate. By the addition of ice, the temperature of the solution is reduced to about 5°. Thereupon, in the course of 3-4 hours and while stirring thoroughly, a solution of 15% strength of fumaric acid dichloride in 1,2-dichlorobenzene is uniformly added dropwise until no more diazotizable substance is present in the reaction solution. Care must be taken in this regard, by the dropwise addition of an aqueous sodium carbonate solution of 10% strength, that the reaction of the solution does not become too strongly acid. The thus-formed mixture of disazo dyestuffs is isolated by salting-out and filtering off. It is similar to the mixtures described in Examples 9 and 10.

In order to convert the mixture of disazo dyestuffs into the copper complex in substance, the mixture is dissolved in about 2500 parts of water at 60-70°, after which an ammoniacal copper oxide solution corresponding to 50 parts of copper sulfate is added. After stirring for a time, the product is salted out, filtered off and dried. The thus-obtained mixture of copper complexes is very similar to the complex described in Example 9.

A dyestuff mixture which likewise possesses outstanding properties is obtained when 96 parts of the aminoazo compound obtained from diazotized 2-aminobenzene-1-carboxylic acid and 4-amino-4'-(3''-methyl-5''-pyrazolone) - stilbene-2,2'-disulfonic acid, and 27.2 parts of the aminoazo compound obtained from diazotized 2-amino-1-carboxybenzene-5-sulfonic acid and 4-amino-4'-(3''-methyl-5''-pyrazolone)-stilbene-2,2'-disulfonic acid are dissolved in approximately 3500 parts of water with addition of sodium bicarbonate, then treated with fumaric acid dichloride and thereafter with a copper-yielding agent, and the produced dyestuff mixture isolated.

Example 12

28 parts of the aminoazo compound of Formula VIII are dissolved in 500 parts of hot water with addition of sodium carbonate. To the resultant dyestuff solution there are successively added 15 parts of crystalline sodium acetate and a solution of 10.5 parts of crystalline copper sulfate in 100 parts of water. Stirring is continued for some time at 60-70°, the solution of the now present complex copper compound neutralized with sodium bicarbonate until it has a weakly alkaline reaction to litmus. 8 more parts of sodium bicarbonate added, the volume of the solution adjusted to 800 parts by volume by the addition of water, and the whole then cooled to 0-5° C. At the latter temperature and in the course of 2-3 hours, a solution of 10% strength of chlorofumaric acid dichloride in chlorobenzene is evenly added dropwise, until no more free amino groups can be detected. The solution is then heated to 60-70°, the complex copper compound of the thus obtained disazo dyestuff precipitated by the addition of sodium chloride, the mixture stirred for a short time at 60-70° and the precipitate then filtered off warm.

The thus obtained coppered dyestuff

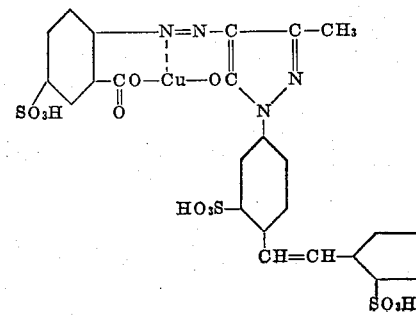
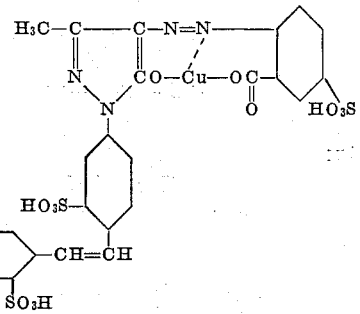

is a brownish powder which dissolves in water and in concentrated sulphuric acid with yellow coloration. It dyes cotton and regenerated cellulose in pure yellow shades of excellent fastness to light and of very good wet-fastness properties.

A similar dyestuff is obtained when, while otherwise proceeding as precedingly described, the chlorofumaric acid dichloride is replaced by an equivalent quantity of bromofumaric acid dichloride.

Having thus disclosed the invention what is claimed is:

1. A substantive yellow disazo dyestuff of the formula

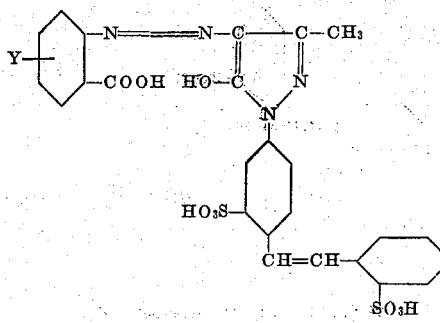 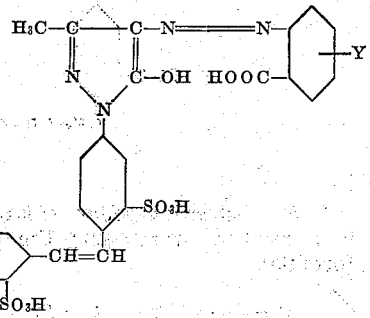

wherein Y stands for a member selected from the group consisting of H and $SO_3H$, and A stands for a member selected from the group consisting of H, Cl, Br and $CH_3$.

2. The substantive yellow disazo dyestuff of of the formula

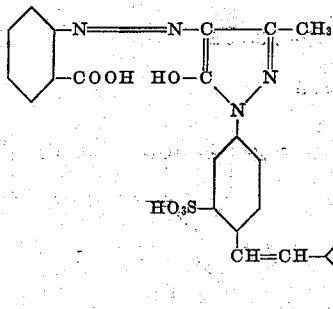 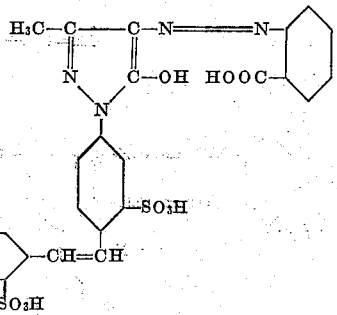

3. The substantive yellow disazo dyestuff of the formula

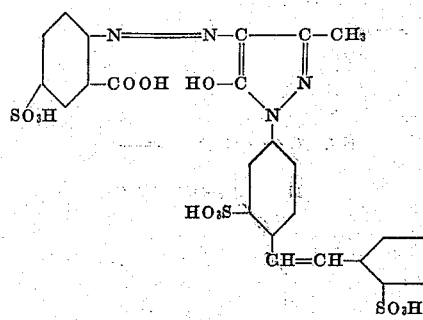 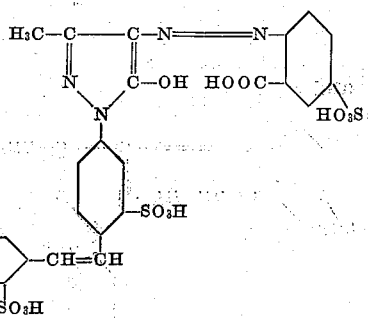

4. The substantive yellow disazo dyestuff of the formula

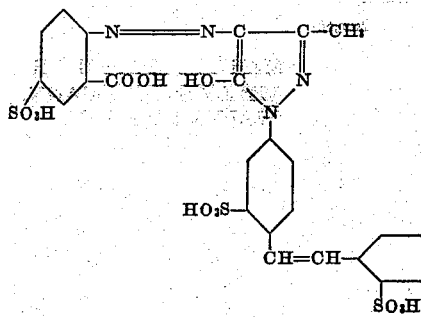 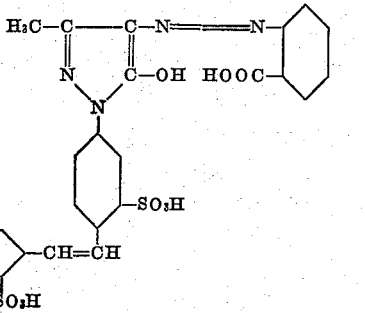

5. A substantive yellow disazo dyestuff of the formula
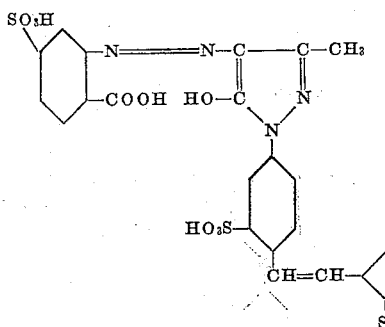 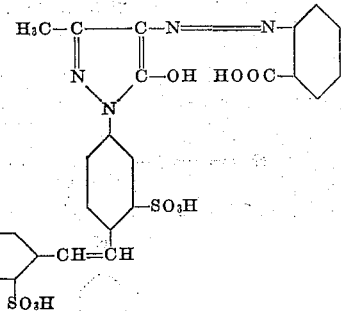
6. A substantive yellow disazo dyestuff which is a mixture comprising the dyestuffs of the formulae
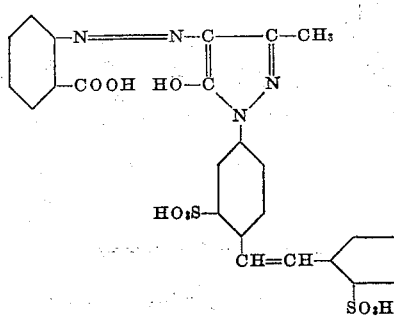 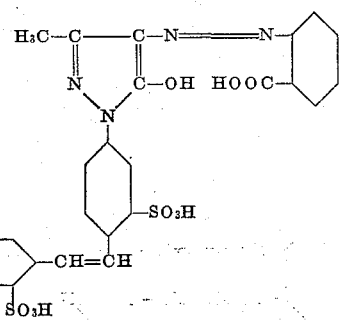
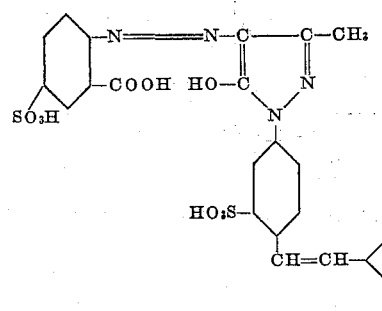 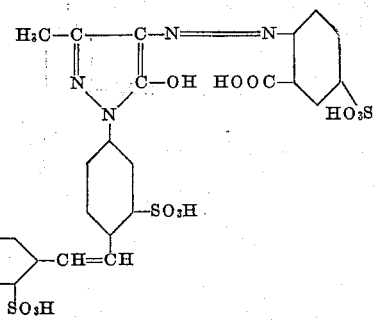
and
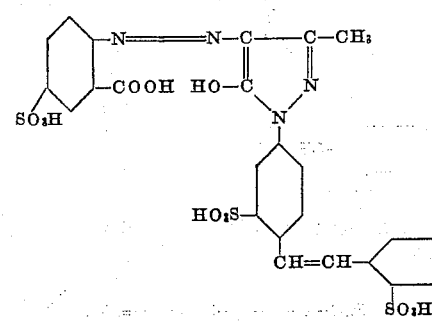 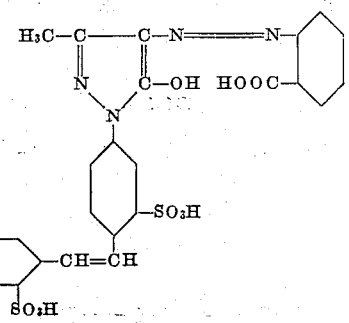
MARKUS KAPPELER.
WILLY STEINEMANN.
WALTER WEHRLI.
No references cited.